United States Patent
Hamed et al.

(10) Patent No.: US 6,617,277 B2
(45) Date of Patent: *Sep. 9, 2003

(54) SUPPORTED METALLOCENE CATALYST SYSTEM FOR OLEFIN POLYMERIZATION

(75) Inventors: Orass Hamed, Riyadh (SA); Akhlaq Moman, Riyadh (SA); Atieh Abu-Raqabah, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 09/950,014

(22) Filed: Sep. 10, 2001

(65) Prior Publication Data

US 2002/0099154 A1 Jul. 25, 2002

Related U.S. Application Data

(63) Continuation of application No. 09/416,282, filed on Oct. 12, 1999, now Pat. No. 6,288,182.

(51) Int. Cl.[7] .............................. B01J 31/38; C08F 4/16; C08F 4/44
(52) U.S. Cl. ................. 502/104; 502/117; 502/118; 502/125; 502/132; 502/133; 502/152; 526/124.3; 526/156; 526/160; 526/904; 526/943
(58) Field of Search ................ 526/124.3, 156, 526/160, 904, 943; 502/104, 117, 118, 125, 132, 133, 152

(56) References Cited

U.S. PATENT DOCUMENTS

| 5,614,456 A | | 3/1997 | Mink et al. | |
|---|---|---|---|---|
| 6,111,040 A | * | 8/2000 | Shimizu et al. | 526/153 |

FOREIGN PATENT DOCUMENTS

| EP | 0 314 131 | 5/1989 |
|---|---|---|
| EP | 0 435 514 | 7/1991 |
| EP | 0 656 373 | 6/1995 |
| WO | WO 99/43722 | 9/1999 |

\* cited by examiner

*Primary Examiner*—Robert D. Harlan
(74) *Attorney, Agent, or Firm*—Kramer Levin Naftalis & Frankel LLP

(57) ABSTRACT

A catalyst composition has a catalyst component which includes a metallocene transition metal compound, a magnesium compound, a hydroxyl containing compound, and a polymeric material. The catalyst component may also include asilicon compound and an aluminum compound. The catalyst component is combined with a cocatalyst and used in olefin polymerization.

27 Claims, No Drawings

US 6,617,277 B2

SUPPORTED METALLOCENE CATALYST SYSTEM FOR OLEFIN POLYMERIZATION

This application is a continuation of application Ser. No. 09/416,282, filed Oct. 12, 1999, now U.S. Pat. No. 6,288,182, which is incorporated herein by reference in its entirety.

FIELD OF THE INVENTION

This invention relates to supported metallocene olefin polymerization catalyst systems, methods of producing the catalysts and methods of polymerizing alpha-olefins with the catalysts to form polymers having narrow molecular weight distribution. More particularly, this invention relates to the preparation of a catalyst precursor component comprising a metallocene containing transition metal compound, a magnesium containing compound, an aluminum compound, a silicon compound and a polymeric support material. The catalyst precursor component is combined with a cocatalyst and used in olefin polymerization.

BACKGROUND OF THE INVENTION

The polymerization of olefins, such as ethylene, propylene and other alpha-olefins is an important industrial process which is run on a huge scale around the world. Important factors in the polymerization process are the properties and cost of the polymer product which relate to the catalyst used in the process. The use of certain types of catalysts results in the presence of residue of catalyst components in the polymer product. In one type of polymerization process, the catalyst is prepared in situ. In other types of polymerization processes, the catalyst is fully or partially prepared before use in the polymerization process. A catalyst and its components (co-catalyst, modifiers, external electron donors, etc.) can be attached to a solid support material or the catalyst and its components can be added individually. This means that in certain types of catalyst systems, the catalyst components (co-catalyst, modifiers, external electron donors, etc.,) can be added individually to the reaction medium during the polymerization process. On the other hand, there are other cases in which the catalyst can be premixed with all its components during the catalyst preparation process resulting in the addition of one catalyst component to the reaction medium during the polymerization process.

The preparation of supported metallocene catalysts has previously been complicated and expensive. For example, the preparation of supported metallocene catalysts has required expensive and troublesome silica dehydration and aluminoxanes treatment during catalyst preparation. Procedures typically used for the preparation of silica supports such as spray drying or re-crystallization processes are complicated and expensive. Also, high calcination temperatures are required to remove water, which is a common catalyst poison. These steps represent a significant proportion of the preparation of the catalyst. In addition, the use of silica as a support results in the presence of support residue in the polymerization product, which can affect product processing and properties, such as optical properties.

Since the type of catalyst system used plays a major role in the polymerization process, the form and the physical properties of the catalyst system are important. For example, a solid catalyst system in the form of granules, often supported on silica or magnesium chloride, is usually used in gas phase and liquid slurry polymerization processes in order to reduce possible fouling of the reactor.

One of the objects of the present invention is to overcome the difficulties encountered in the prior art. The present invention provides a new development in olefin polymerizations. The supported metallocene catalyst system of the invention in which polyvinylchloride is used as a polymeric support can be used in both slurry and gas phase polymerization processes.

SUMMARY OF THE INVENTION

The present invention provides a catalyst composition comprising a catalyst component which comprises a metallocene compound, a magnesium compound, a silicon compound, a hydroxyl containing compound, an aluminum compound and a polymeric material. The silicon compound and/or aluminum compound are optional. The catalyst component, when used in conjunction with a co-catalyst such as an organoaluminum compound or a mixture of organoaluminum compounds, is useful for polymerization of ethylene to linear low and medium density polyethylenes and copolymerization of ethylene with alpha-olefins having about 3 to 18 carbon atoms. The catalyst composition has the ability to produce polymers with narrow molecular weight distributions.

DETAILED DESCRIPTION OF THE INVENTION

The catalyst composition of the present invention contains a solid catalyst component. The solid catalyst component contains at least a metallocene compound, a magnesium compound, a hydroxyl containing compound, and a polymeric material having a mean particle diameter of 5 $\mu$m to 1000 $\mu$m, a pore volume of 0.1 cc/g or above, a pore diameter of at least 10 angstroms or a pore diameter of 500 to 10,000 Angstroms and a surface area of from 0.2 $m^2$/gm to 15 $m^2$/gm. The solid catalyst component may also contain a silicon compound and an aluminum compound. The solid catalyst component is useful in olefin polymerization catalysts.

Metallocenes suitable for use in the invention can be represented by the general formula $(Cp)_zMR_wX_y$ wherein Cp represents a substituted or unsubstituted cyclopentadienyl ring; M represents a Group IVB or VB transition metal of the Periodic Table of the Elements (CAS Version); R represents a hydrocarbyl radical such as alkyl, said hydrocarbyl radical containing 1 to 20 carbon atoms, e.g., methyl, ethyl or propyl; X represents a halogen atom; and $1 \leq z \leq 3$, $0 \leq w \leq 3$, and $0 \leq y \leq 3$. The cyclopentadienyl ring may be substituted with a hydrocarbyl radical such as alkyl, alkenyl or aryl, said hydrocarbyl containing 1 to 20 carbon atoms; such as methyl, ethyl, propyl, aryl, isoamyl, isobutyl, phenyl and the like. The preferred transition metals are titanium, zirconium or vanadium.

Preferred metallocene compounds include bis(cyclopentadienyl) zirconium dimethyl, bis(cyclopentadienyl)zirconium methyl chloride, bis(cyclopentadienyl) zirconium ethyl chloride and bis(cyclopentadienyl)zirconium dichloride.

The magnesium compounds used for the solid catalyst component include Grignard compounds represented by the general formula $R^3MgX$, wherein $R^3$ is a hydrocarbyl group of 1 to 20 carbon atoms and X is a halogen atom; preferably chlorine.

The magnesium compound is preferably a reagent with the chemical formula $R_aM_gX_{2-a}$ wherein R is an alkyl group having 1 to 20 carbon atoms and X is halogen or alkyl group independently having 1 to 20 carbon atoms and a is 0, 1 or 2.

Other preferred magnesium compounds are represented by the general formula $R^4R^5Mg$, wherein $R^4$ and $R^5$ are the same or different hydrocarbyl group of 1 to 20 carbon atoms.

Preferred magnesium compounds include the following: dialkylmagnesium such as diethylmagnesium, dipropylmagnesium, di-iso-propylmagnesium, di-n-butylmagnesium, di-iso-butylmagnesium, butylethylmagnesium, dihexylmagnesium, dioctylmagnesium butyloctyl magnesium; alkyl magnesium chloride such as ethylmagnesium chloride, butylmagnesium chloride, hexylmagnesium chloride and the like.

A silicon compound which can be used in the synthesis of the solid catalyst component in this invention can be represented by the general formula $MX_4$, wherein M is a metalloid of Group IV, preferably silicon; and X is a halogen atom, preferably chlorine.

The hydroxyl containing compound used in the synthesis of the solid catalyst component in this invention can be represented by the general formula $Z^+OH^-$ or $R^+OH^-$ wherein $Z^+$ is a metal of Groups IA to VIA, or a non metal cation, e.g., $^+NH_4$ or even $H^+$. R can be a hydrocarbyl group of 1 to 20 carbon atoms, and R is preferably alkyl.

An aluminum compound can be used in small amounts in the synthesis of the solid catalyst component of this invention to treat the polymeric support after treatment with hydroxyl compound. Alkyl aluminoxanes are the preferred aluminum compounds for this treatment of the support.

The polymer particles used in the present invention have a spherical shape with a particle diameter of 5 to 1000 $\mu$m, preferably 10 to 800 $\mu$m, and more preferably 15 to 500 $\mu$m, a pore diameter of 500 to 10,000 Angstroms, a pore volume of 0.1 cm$^3$/g or above, preferably 0.2 cm$^3$/g or above, and a surface area of from 0.2 m$^2$/gm to 15 m$^2$/gm. Examples of the polymeric support useful herein include particles of polyolefins, polyvinylchloride, polyvinylalcohol or polycarbonate, more particularly, beads of polymers such as polyvinylchloride, polyvinylalcohol, ethylene-vinylalcohol copolymer, polymethylacrylate, polyethylacrylate, polymethylmethacrylate, and the like. Among these polymeric materials the vinylpolymers are more preferred and polyvinylchloride is most preferred. The preferred shape for the particles is spherical. The polyvinylchloride particles preferably have a molecular weight in the range of 5,000 to 200,000 g/mol.

The polymer particles used in the present invention have surface active sites such as labile chlorine atoms present in polyvinylchloride. Preferably, these active sites are reacted stoichiometrically with the organic magnesium compound.

The use of the polymer particles in this invention offers significant advantages over traditional olefin polymerization catalysts which use supports such as silica or magnesium chloride. In comparison to the silica supported catalyst, the polymer particles described in catalyst preparation of the invention require no high temperature and prolonged dehydration steps prior to their use in catalyst synthesis, thereby simplifying the synthesis process and thus reducing the overall cost of catalyst preparation. Furthermore, the cost of the polymeric support used in the present invention is substantially lower than the cost of silica or magnesium chloride supports. In addition, the catalyst in the present invention uses significantly lower levels of catalyst precursors for catalyst preparation than silica or magnesium chloride supported catalysts. It should be noted that it is both helpful and necessary to reduce the amounts of the catalyst precursors used, since this will help in reducing the catalyst preparation cost and will also help in reducing the amount of chemicals wasted during each catalyst preparation process. For example, in preparing a standard supported metallocene catalyst using silica, a metal loading of about 0.5% is required to produce an active catalyst. Meanwhile, according to the present invention, a metal loading as low as 0.06% is more than enough to produce a highly active catalyst (see Examples 11 and 12 below). This lower metal loading uses an amount of metal precursor which is eight times less than that of the standard supported metallocene catalysts. Also, the catalyst in the present invention is more active than the conventional silica or magnesium chloride supported Ziegler-Nata and conventional metallocene catalyst systems.

According to one embodiment, a polyvinyl chloride support is used. The synthesis of the solid catalyst component in the present invention involves introducing the polymeric material described above into a vessel and then adding a diluent. Suitable diluents include alkanes such as isopentane, hexane, and heptane, and ethers such as diethylether and dibutylether. The polymeric material is then treated with a magnesium compound described above at a temperature in the range of about 20° C. to 110° C. The ratio of magnesium compound to the polymer support can be in the range of 0.1 mmol to 10 mmol magnesium compound per gram polymer. The excess or unreacted magnesium chloride is then removed by washing with suitable solvents such as hexane, heptane or isooctane.

The resulting free flowing solid product is then slurried. Suitable solvents for slurrying include hexane, cyclohexane, heptane, isooctane and pentamethylheptane. The slurried material is treated with a chlorinating agent such as silicon tetrachloride at a temperature in the range of about 40° C. to 120° C.

The chlorinated product is further treated with a hydroxyl containing compound such as ammonium hydroxide, sodium hydroxide, ethyl alcohol or even water to hydroxylate the support. The hydroxylated product is washed thoroughly with an organic solvent such as n-hexane. An organoaluminium compound such as methylaluminoxane can be used in small amounts to finally treat the solid support prior to the addition of the metallocene precursor. By metallocene precursor is meant any type of metallocene compound used in the catalyst preparation process. These include, e.g., zirconocene dichloride, methyl zirconocene, aryl zirconocene, etc.

According to this invention, the washed product is optionally treated with organoaluminum compound and then treated with a metallocene compound described above at a temperature in the range of about 40° C. to 120° C. Bis (cyclopentadienyl)zirconium dichloride is the preferred metallocene compound. The metallocene treated solid catalyst component is then washed with a suitable solvent such isopentane, n-hexane, cyclohexane, n-heptane, isooctane or pentamethylheptane, preferably isopentane or n-hexane, and dried using a nitrogen purge at a temperature in the range of about 20° C. to 80° C.

In some embodiments in which zirconium containing metallocene and aluminum compounds are used in the synthesis, the final solid catalyst components have a molar ratio of Al:Zr of about 2:1 to about 50:1, preferably about 5:1 to about 20:1.

The catalyst component is activated with suitable activators, also known as co-catalysts, for olefin polymerization. The preferred compounds for activation of the solid catalyst component are organoaluminum compounds.

The cocatalyst is a transition metal (zirconium) site activator, such as aluminoxanes, represented by the general formula

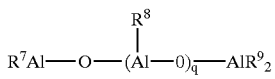

for a linear aluminoxane, where q represents a number satisfying $0 \leq q \leq 50$ and/or

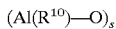

for a cyclic aluminoxane, wherein s represents a number satisfying $3 \leq s \leq 50$, and wherein $R^7$, $R^8$, $R^9$ and $R^{10}$ are either the same or different linear, branched or cyclic alkyl group of 1 to 12 carbons; such as methyl, ethyl, propyl or isobutyl. A preferred cocatalyst is a mixture of a trialkyl aluminum and an alkyl aluminoxane. A preferred activator for zirconium sites is methylaluminoxane. Since commercially produced methylaluminoxane contains trimethylaluminum, commercially produced methylaluminoxane can itself be conveniently used to provide a mixture of aluminoxanes.

The organoaluminum compounds in this invention can be used preferably in the range of about 1 to 1500 moles of aluminum per one mole of transition metal in the catalyst, and more preferably in the range of about 50 to 800 moles aluminum per one mole of transition metal. Preferably, the cocatalyst is present in an amount which provides a ratio of aluminum atoms in the cocatalyst to zirconium atoms in the catalyst precursor component from about 10:1 to about 1500:1.

Gel permeation chromatography of polymers produced using the catalyst compositions of this invention shows a narrow molecular weight distribution. The catalyst systems of the present invention are of high productivity of at least about 3–4 kilograms of polymer per gram of catalyst.

The linear polyethylene polymers prepared using the catalyst systems of this invention include homopolymers of ethylene or copolymers of ethylene with one or more $C_3$ to $C_{10}$ alpha-olefins. Particular examples of these copolymers include ethylene/1-butene copolymers, ethylene/1-hexene copolymers, ethylene/1-octene copolymers, ethylene 4-methyl-1-pentene copolymers. Ethylene/1-hexene and ethylene/1-butene are the most preferred copolymers polymerized using the catalyst systems of this invention.

EXAMPLES

The following examples are intended to be illustrative of this invention. They are, of course, not to be taken in any way limiting to the scope of this invention. Numerous changes and modifications can be made without departing from the spirit of the invention.

Example 1
Synthesis of Catalyst A

To a three-necked round bottom flask, equipped with a condenser and stirrer, were added 5.5 g of polyvinylchloride spheres of 50 μm average particle size (supplied by SABIC, Saudi Arabia). The flask containing the polyvinylchloride was heated to 75° C. using an oil bath and then evacuated at 30 mm Hg pressure for 30 minutes. The flask and its contents were purged with dried nitrogen and the polyvinylchloride was slurried using 40 cc of n-hexane. Then 2.5 cc of 2M butylmagnesium chloride was added to the slurry and the resultant mixture was stirred for 30 minutes at 75° C. The stirring was stopped and the supernatant liquid was removed by cannula leaving modified polyvinylchloride. The modified polyvinylchloride was slurried using 40 cc of n-hexane, and stirred with 1.5 cc of 2M solution of silicon tetrachloride for 20 minutes at 75° C. The stirring was stopped and the supernatant liquid was removed by cannula. The resulting solid was washed once by stirring with 30 cc of n-hexane and slurried again with 40 cc of n-hexane. Then 0.4 cc of 30% ammonium hydroxide solution was added gradually to the slurry and the slurry was mixed for 5 minutes during which the evolving ammonium chloride fumes were vented from the flask under nitrogen purge. The stirring was stopped and the supernatant liquid was removed by cannula. The resulting solid was washed three times by stirring with 50 cc aliquots of n-hexane and then removing the solvent by cannula after each wash. The solid product was stirred with zirconocene dichloride solution (0.11 g of $Cp_2ZrCl_2$ in 20 cc diethylether and 20 cc toluene) for 60 minutes at 75° C. The stirring was stopped and the supernatant liquid was removed by cannula. The resulting solid was washed by stirring with 50 cc of n-hexane. Finally, the solid catalyst was dried using a nitrogen purge for thirty minutes to yield a free-flowing white solid product. The solid catalyst component was analyzed by atomic adsorption spectroscopy and was found to contain 0.15% by weight of zirconium atoms, 0.52% by weight of magnesium atoms and 0.11% by weight of silicon atoms.

Example 2
Ethylene Homopolymerization

An autoclave with a volume of 2 liters was purged with nitrogen at 130° C. for 30 minutes. After cooling the autoclave to 80° C., one liter of n-hexane was introduced to the reactor, then the reactor was pressurized with 0.1 bar hydrogen followed by pressurizing the reactor up to 15 bar with ethylene. Then 2.0 cc of M-MAO (methylaluminoxane) solution (7 wt% Al) was injected into the reactor by means of a catalyst injection pump. This was followed by injection of 0.20 g of the solid catalyst A described in Example 1 slurried in 20 cc of n-hexane solvent. The reactor temperature was raised to 85° C. Ethylene polymerization was carried out for 30 minutes, with ethylene supplied on demand to maintain the total reactor pressure at 15 bar. 86.5 grams of polyethylene were recovered.

The polyethylene was examined by GPC and was found to have a weight average molecular weight of 138,000, a number average molecular weight of 47,000 and a broad molecular weight distribution of 2.9.

Average rate of Polymerization=

$$\frac{86.5 \text{ g} \times 0.463 \text{ psi}}{0.00246 \text{ mmol} \times 0.5 \text{ hr}} = 32{,}557 \text{ g PE/mmol Zr h, at 100 psig}$$

Example 3
Synthesis of Catalyst B

To a three-necked round bottom flask equipped with a condenser and stirrer, were added 7.0 g of polyvinylchloride spheres of 50 μm average particle size (supplied by SABIC, Saudi Arabia). The flask containing the polyvinylchloride was heated to 80° C. using an oil bath and evacuated at 30 mm Hg pressure for 30 minutes. The flask and its contents were purged with dried nitrogen and after cooling the flask down to 45° C., the polyvinylchloride was slurried using 40 cc of iso-pentane. Then 2.5 cc of 2M butylmagnesium chloride was added to the slurry and the resultant mixture was stirred for 30 minutes at 45° C.

The stirring was continued and the supernatant liquid was allowed to evaporate under nitrogen purge at 65° C. leaving modified polyvinylchloride. The modified polyvinylchloride was slurried using 40 cc of n-hexane. Then 0.2 cc of 30% ammonium hydroxide solution was added directly to the slurry and the slurry was mixed for 5 minutes during which the evolving ammonium chloride fumes were vented from the flask under a continuous purge of nitrogen. The resulting solid was washed three times by stirring with 50 cc aliquots of n-hexane and removing the solvent by cannula after each wash. The solid product was stirred with zirconocene dichloride solution (0.13 g of $Cp_2ZrCl_2$ in 20 cc diethylether and 20 cc toluene) for 60 minutes at 75° C. The stirring was stopped and the supernatant liquid was removed by cannula. The resulting solid was washed by stirring with 50 cc of n-hexane. Finally, the solid catalyst was dried using a nitrogen purge for thirty minutes to yield a free-flowing white solid product. The solid catalyst component was analyzed by atomic adsorption spectroscopy and was found to contain 0.07% by weight of zirconium atoms and 1.4% by weight of magnesium atoms.

Example 4
Ethylene Homopolymerization

An autoclave with a volume of 2 liters was purged with nitrogen at 130° C. for 30 minutes. After cooling the autoclave to 80° C., one liter of n-hexane was introduced to the reactor and the reactor was pressurized with 0.1 bar hydrogen followed by pressurizing the reactor up to 15 bar with ethylene. Then 1.5 cc of M-MAO solution (7 wt% Al) were injected into the reactor by means of a catalyst injection pump. This was followed by injection of 0.15 g of the solid catalyst B described in Example 3, slurried in 20 cc of n-hexane solvent. The reactor temperature was raised to 85° C. Ethylene polymerization was carried out for 30 minutes, with ethylene supplied on demand to maintain the total reactor pressure at 15 bar; 117.2 grams of polyethylene were recovered.

The polyethylene was examined by GPC and was found to have a high average molecular weight of 213,270, a number average molecular weight of 56,952 and a broad molecular weight distribution of 3.7.

Average rate of Polymerization=

$$\frac{117.2 \text{ g} \times 0.463 \text{ psi}}{0.00115 \text{ mmol} \times 0.5 \text{ hr}} = 94,202 \text{ g PE/mmol Zr h, at 100 psig}$$

Example 5
Synthesis of Catalyst C

To a three-necked round bottom flask, equipped with a condenser and stirrer, were added 7.5 g of polyvinylchloride spheres of 50 µm average particle size (supplied by SABIC, Saudi Arabia). The flask containing the polyvinylchloride was heated up to 75° C. using an oil bath and then evacuated at 30 min Hg pressure for 30 minutes.

The flask and its contents were purged with dried nitrogen and the polyvinylchloride was slurried using 40 cc of n-hexane at 75° C. Then 2.5 cc of 2M solution dibutylmagnesium was added to the slurry and the resultant mixture was stirred for 30 minutes at 75° C. The stirring was stopped and the supernatant liquid was removed by cannula leaving modified polyvinylchloride. The modified polyvinylchloride was slurried using 40 cc of n-hexane, and stirred with 1.0 cc of 2M solution of silicon tetrachloride for 20 minutes at 75° C. The stirring was stopped and the supernatant liquid was removed by cannula. The resulting solid was washed once by stirring with 40 cc of n-hexane and slurried again with 40 cc of n-hexane. Then 0.3 cc of 30% ammonium hydroxide solution was added gradually to the slurry and the slurry was mixed for 5 minutes during which the evolving ammonium chloride fumes were vented from the flask under continuous purge of nitrogen. The stirring was stopped and the supernatant liquid was removed by cannula. The resulting solid was washed three times by stirring with 50 cc aliquots of n-hexane, removing the solvent by cannula after each wash. The solid product was then stirred with 1.2 cc of modified methylaluminoxane in n-heptane (7% wt Al), for 20 minutes at 75° C. The stirring was stopped and the supernatant liquid was removed by cannula. The solid product was stirred with zirconocene dichloride solution (0.12 g of $Cp_2ZrCl_2$ in 20 cc diethylether and 20 cc toluene) for 60 minutes at 75° C. The stirring was stopped, the supernatant liquid was removed by cannula and the resulting solid was washed by stirring with 50 cc of n-hexane. Finally, the solid catalyst was dried using a nitrogen purge for thirty minutes to yield a free-flowing white colored solid product. The solid catalyst component was analyzed by atomic adsorption spectroscopy and was found to contain 0.10% by weight of zirconium atoms, 0.42% by weight of aluminum, 0.14% by weight of magnesium atoms 0.24% by weight of silicon atoms and [Al]: [Zr]=15:1.

Example 6
Ethylene Homopolymerization

An autoclave with a volume of 2 liters was purged with nitrogen at 130° C. for 30 minutes. After cooling the autoclave to 80° C., one liter of n-hexane was introduced to the reactor and the reactor was pressurized with 15 bar of ethylene. Then 1.5 cc of M-MAO solution (7 wt% Al) was injected into the reactor by means of a catalyst injection pump. This was followed by injection of 0.15 g of the solid catalyst C described in Example 5 slurried in 20 cc of n-hexane solvent. The reactor temperature was raised to 85° C. Ethylene polymerization was carried out for 30 minutes with ethylene supplied on demand to maintain the total reactor pressure at 15 bar and 117.5 grams of polyethylene were recovered.

The polyethylene was examined by GPC and was found to have a weight average molecular weight of 124,434, a number average molecular weight of 54,383 and a broad molecular weight distribution of 2.2.

Average rate of Polymerization=

$$\frac{117.5 \text{ g} \times 0.463 \text{ psi}}{0.00164 \text{ mmol} \times 0.5 \text{ hr}} = 66,339 \text{ g PE/mmol Zr h, at 100 psig}$$

Example 7
Synthesis of Catalyst D

To a three-necked round bottom flask, equipped with a condenser and stirrer, were added 7.5 g of polyvinylchloride spheres of 50 µm average particle size (supplied by SABIC, Saudi Arabia). The flask containing the polyvinylchloride was heated to 75° C. using an oil bath and evacuated at 30 mm Hg pressure for 30 minutes. The flask and its contents were purged with dried nitrogen and the polyvinylchloride was slurried using 40 cc of diethylether after cooling the flask down to 45° C. Then 2.5 cc of 2M butylmagnesium chloride was added to the slurry and the resultant mixture was stirred for 30 minutes at 45° C. The stirring was continued and the supernatant liquid was allowed to evaporate under nitrogen purge at 65° C. leaving modified polyvinylchloride. The modified polyvinylchloride was slurried using 40 cc of n-hexane, and treated with 0.3 cc of 99.7% ethyl alcohol, which was added gradually to the slurry and the slurry was mixed for 15 minutes. The stirring was stopped and the supernatant liquid was removed by cannula. The resulting solid was washed three times by stirring with 50 cc aliquots of n-hexane, removing the solvent by cannula after each wash. The solid product was stirred with zirconocene dichloride solution (0.12 g of $Cp_2ZrCl_2$ in 20 cc diethylether and 20 cc toluene) for 60 minutes at 75° C. The stirring was stopped and the supernatant liquid was removed by cannula. The resulting solid was washed by stirring with 50 cc of n-hexane. Finally, the solid catalyst was dried using a nitrogen purge for thirty minutes to yield a free-flowing white solid product. The solid catalyst component was analyzed by atomic adsorption spectroscopy and was found to contain 0.16% by weight of zirconium atoms and 1.30% by weight of magnesium atoms.

Example 8
Ethylene Homopolymerization

An autoclave with a volume of 2 liters was purged with nitrogen at 130° C. for 30 minutes. After cooling the autoclave to 80° C., one liter of n-hexane was introduced to the reactor and the reactor was pressurized with 0.1 bar hydrogen followed by pressurizing the reactor up to 15 bar with ethylene. Then 1.5 cc of M-MAO solution (7 wt% Al) was injected into the reactor by means of a catalyst injection pump. This was followed by injection of 0.15 g of the solid catalyst D described in Example 7 slurried in 20 cc of n-hexane solvent. The reactor temperature was raised to 85° C. Ethylene polymerization was carried out for 30 minutes with ethylene supplied on demand to maintain the total reactor pressure at 15 bar and 64.5 grams of polyethylene were recovered.

The polyethylene was examined by GPC and was found to have a high weight average molecular weight of 194,000, a number average molecular weight of 60,200 and a broad molecular weight distribution of 3.2.

Average rate of Polymerization=

$$\frac{64.5 \text{ g} \times 0.463 \text{ psi}}{0.00263 \text{ mmol} \times 0.5 \text{ hr}} = 22{,}708 \text{ g PE/mmol Zr h, at 100 psig}$$

Example 9
Synthesis of Catalyst E

To a three-necked round bottom flask, equipped with a condenser and stirrer, were added 6.0 g of polyvinylchloride spheres of 50 $\mu$m average particle size (supplied by SABIC, Saudi Arabia). The flask containing the polyvinylchloride was heated to 75° C. using an oil bath and then evacuated at 30 mm Hg pressure for 30 minutes. The flask and its contents were purged with dried nitrogen and the polyvinylchloride was slurried using 40 cc of n-hexane at 75° C. Then 3.0 cc of 2M solution butylmagnesium chloride was added to the slurry and the resultant mixture was stirred for 30 minutes at 75° C. The stirring was stopped and the supernatant liquid was removed by cannula leaving modified polyvinylchloride. The modified polyvinylchloride was slurried using 40 cc of n-hexane and stirred with 2.0 cc of 2 M solution of silicon tetrachloride for 15 minutes at 75° C. The stirring was stopped and the supernatant liquid was removed by cannula. The resulting solid was washed once by stirring with 40 cc of n-hexane and slurried again with 40 cc of n-hexane. Then 0.05 cc of diionized water was added gradually to the slurry and the slurry was mixed for 5 minutes during which the evolving hydrogen chloride fumes were vented from the flask under continuous nitrogen purge. The stirring was stopped and the supernatant liquid was removed by cannula. The resulting solid was washed three times by stirring with 50 cc aliquots of n-hexane, removing the solvent by cannula after each wash. The solid product was then stirred with zirconocene dichloride solution (0.13 g of $Cp_2ZrCl_2$ in 20 cc diethylether and 20 cc toluene) for 60 minutes at 75° C. The stirring was stopped and the supernatant liquid was removed by cannula. The resulting solid was washed by stirring with 50 cc of n-hexane. Finally, the solid catalyst was dried using a nitrogen purge for thirty minutes to yield a free-flowing white solid product. The solid catalyst component was analyzed by atomic adsorption spectroscopy and was found to contain 0.09% by weight of zirconium atoms, 0.19% by weight of magnesium atoms and 0.22% by weight of silicon atoms.

Example 10
Ethylene Homopolymerization

An autoclave with a volume of 2 liters was purged with nitrogen at 130° C. for 30 minutes. After cooling the autoclave to 80° C., one liter of n-hexane was introduced to the reactor, and the reactor was pressurized with 0.1 bar hydrogen followed by pressurizing the reactor up to 15 bar with ethylene. Then 2.0 cc of M-MAO solution (7 wt% Al) was injected into the reactor by means of a catalyst injection pump. This was followed by injection of 0.20 g of solid catalyst E described in Example 9 slurried in 20 cc of n-hexane solvent. The reactor temperature was raised to 85° C. Ethylene polymerization was carried out for 30 minutes, with ethylene supplied on demand to maintain the total reactor pressure at 15 bar; 71.8 grams of polyethylene were recovered.

The polyethylene was examined by GPC and was found to have an weight average molecular weight of 121,000, a number average molecular weight of 45,200 and a broad molecular weight distribution of 2.6.

Average rate of Polymerization=

$$\frac{71.8 \text{ g} \times 0.463 \text{ psi}}{0.00148 \text{ mmol} \times 0.5 \text{ hr}} = 44{,}919 \text{ g PE/mmol Zr h, at 100 psig}$$

Example 11
Synthesis of Catalyst F

To a three-necked round bottom flask, equipped with a condenser and stirrer, were added 6.0 g of polyvinylchloride spheres of 30 $\mu$m average particle size (supplied by SABIC, Saudi Arabia). The flask containing the polyvinylchloride was heated to 75° C. using an oil bath and then evacuated at 30 mm Hg pressure for 30 minutes. The flask and its contents were purged with dried nitrogen and the polyvinylchloride was slurried using 40 cc of n-hexane at 75° C. Then 2.0 cc of 2M solution dibutylmagnesium were added to the slurry and the resultant mixture was stirred for 30 minutes at 75° C. The stirring was stopped and the supernatant liquid was removed by cannula leaving modified polyvinylchloride. The modified polyvinylchloride was slurried using 40 cc of n-hexane and stirred with 2.0 cc of 2 M solution of silicon tetrachloride for 20 minutes at 75° C. The stirring was stopped and the supernatant liquid was removed by cannula. The resulting solid was washed once by stirring with 40 cc of n-hexane and slurried again with 40 cc of n-hexane. Then 0.2 cc of 20% sodium hydroxide solution was added gradually to the slurry and the slurry was mixed for 5 minutes. The stirring was stopped and the supernatant liquid was removed by cannula. The resulting solid was washed three times by stirring with 50 cc aliquots of n-hexane and the solvent was removed by cannula after each wash.

The solid product was then stirred with zirconocene dichloride solution (0.12 g of $Cp_2ZrCl_2$ in 20 cc diethylether and 20 cc toluene) for 60 minutes at 75° C. The stirring was stopped and the supernatant liquid was removed by cannula. The resulting solid was washed by stirring with 50 cc of n-hexane. Finally, the solid catalyst was dried using a nitrogen purge for thirty minutes to yield a free-flowing white colored solid product. The solid catalyst component was analyzed by atomic adsorption spectroscopy and was found to contain 0.061% by weight of zirconium atoms, 0.14% by weight of magnesium atoms and 0.10% by weight of silicon atoms.

Example 12

Ethylene-hexene Copolymerization

An autoclave with a volume of 2 liters was purged with nitrogen at 130° C. for 30 minutes. After cooling the autoclave to 80° C., one liter of n-hexane was introduced to the reactor, and the reactor was pressurized up to 15 bar with ethylene. Then 1.5 cc of M-MAO solution (7 wt% Al) was injected into the reactor by means of a catalyst injection pump. This was followed by injection of 15 cc of n-hexene comonomer. Finally, 0.20 g of the solid catalyst F described in Example 11 was injected after being slurried in 20 cc of n-hexane solvent. The reactor temperature was raised to 85° C. Ethylene-hexene copolymerization was carried out for 30 minutes; with ethylene supplied on demand to maintain the total reactor pressure at 15 bar and 76.8 grams of ethylene-hexene copolymer were recovered.

The copolymer was examined by GPC and was found to have an weight average molecular weight of 128,000, a number average molecular weight of 53,800 and a broad molecular weight distribution of 2.3.

Average rate of Polymerization=

$$\frac{76.8 \text{ g} \times 0.463 \text{ psi}}{0.00098 \text{ mmol} \times 0.5 \text{ hr}} = 72{,}562 \text{ g PE/mmol Zr h, at 100 psig}$$

Example 13

Synthesis of Catalyst G

To a three-necked round bottom flask, equipped with a condenser and stirrer, were added 7.0 g of polyvinylchloride spheres of 30 µm average particle size (supplied by SABIC, Saudi Arabia). The flask containing the polyvinylchloride was heated to 75° C. using an oil bath and evacuated at 30 mm Hg pressure for 30 minutes. The flask and its contents were purged with dried nitrogen and the polyvinylchloride was slurried using 40 cc of methyltertiarybutylether after cooling the flask down to 65° C. Then 2.5 cc of 2M butylmagnesium chloride were added to the slurry and the resultant mixture was stirred for 30 minutes at 65° C. The stirring was continued and the supernatant liquid was allowed to evaporate under a continuous nitrogen purge at 70° C. The modified polyvinylchloride was slurried using 40 cc of n-hexane, and stirred with 1.0 cc of 2 M solution of silicon tetrachloride for 20 minutes at 75° C. The stirring was stopped and the supernatant liquid was removed by cannula. The resulting solid was washed once by stirring with 40 cc of n-hexane. Then the modified polyvinylchloride was slurried using 40 cc of n-hexane, and treated with 0.3 cc of 30% ammonium hydroxide, which was added gradually to the slurry and was mixed for 5 minutes, during which the ammonium chloride fumes were vented outside the flask under continuous nitrogen purge. The stirring was stopped and the supernatant liquid was removed by cannula. The resulting solid was then washed three times by stirring with 50 cc aliquots of n-hexane and removing the solvent by cannula after each wash. The solid product was stirred with 1.0 cc of modified methylaluminoxane in n-heptane (7% wt Al), for 20 minutes at 75° C. The stirring was stopped and the supernatant liquid was removed by cannula. The solid product was stirred with zirconocene dichloride solution (0.15 g of $Cp_2ZrCl_2$ in 20 cc Methyl tertiarybutylether and 20 cc toluene) for 60 minutes at 75° C. The stirring was stopped and the supernatant liquid was removed by cannula. The resulting solid was washed by stirring with 50 cc of n-hexane. Finally, the solid catalyst was dried using a nitrogen purge for thirty minutes to yield a free-flowing white solid product. The solid catalyst component was analyzed by atomic adsorption spectroscopy and was found to contain 0.10% by weight of zirconium atoms, 0.43% by weight of aluminum atoms, 1.12% by weight of magnesium atoms and [Al]:[Zr]=14:1.

Example 14

Ethylene-hexene Copolymerization

An autoclave with a volume of 2 liters was purged with nitrogen at 130° C. for 30 minutes. After cooling the autoclave to 80° C., one liter of n-hexane was introduced to the reactor and the reactor was pressurized up to 15 bar with ethylene. Then 1.5 cc of M-MAO solution (7 wt% Al) were injected into the reactor by means of a catalyst injection pump. This was followed by injection of 15 cc of n-hexene comonomer. Finally, 0.15 g of the solid catalyst G described in Example 13 was injected after being slurried in 20 cc of n-hexane solvent. The reactor temperature was raised to 85° C. Ethylene-hexene copolymerization was carried out for 45 minutes; with ethylene supplied on demand to maintain the total reactor pressure at 15 bar and 104.6 grams of ethylene-hexene copolymer were recovered.

The copolymer was examined by GPC and was found to have an weight average molecular weight of 153,683, a number average molecular weight of 62,555 and a broad molecular weight distribution of 2.4.

Average rate of Polymerization=

$$\frac{104.6 \text{ g} \times 0.463 \text{ psi}}{0.00164 \text{ mmol} \times 0.75 \text{ hr}} = 39{,}370 \text{ g PE/mmol Zr h, at 100 psig}$$

Example 15

Synthesis of Catalyst H

To a three-necked round bottom flask, equipped with a condenser and stirrer, were added 7.0 g of polyvinylchloride spheres of 30 µm average particle size (supplied by SABIC, Saudi Arabia). The flask containing the polyvinylchloride was heated to 75° C. using an oil bath and then evacuated at 30 mm Hg pressure for 30 minutes. The flask and its contents were purged with dried nitrogen and the polyvinylchloride was slurried using 40 cc of methyltertiary butylether after cooling the flask down to 65° C. Then 2.5 cc of 2M dibutylmagnesium were added to the slurry and the resultant mixture was stirred for 30 minutes at 65° C. The stirring was continued and the supernatant liquid was allowed to evaporate under a continuous nitrogen purge at 70° C. to provide modified polyvinylchloride. The modified polyvinylchloride was slurried using 40 cc of n-hexane, and stirred with 1.0 cc of 2 M solution of silicon tetrachloride for 20 minutes at 75° C. The stirring was stopped and the supernatant liquid was removed by cannula. The resulting solid was washed once by stirring with 40 cc of n-hexane. Then the modified polyvinylchloride was slurried using 40 cc of n-hexane, and treated with 0.3 cc of 30% ammonium hydroxide, which was added gradually to the slurry and was mixed for 5 minutes, during which ammonium chloride flumes were vented outside the flask under continuous nitrogen purge. The stirring was stopped and the supernatant liquid was removed by cannula. The resulting solid was washed three times by stirring with 50 cc aliquots of n-hexane, removing the solvent by cannula after each wash. The solid product was stirred with 1.0 cc of modified methylaluminoxane in n-heptane (7% wt Al), for 20 minutes at 75° C. The stirring was stopped and the supernatant liquid was removed by cannula. Then the solid product was stirred with zirconocene dichloride solution (0.11 g of $Cp_2ZrCl_2$ in 20 cc methyltertiarybutylether and 20 cc toluene) for 60 minutes at 75° C. The stirring was stopped and the supernatant liquid was removed by cannula. The resulting solid was washed by stirring with 50 cc of n-hexane. Finally, the solid catalyst was dried using a nitrogen purge for thirty minutes to yield a free-flowing white solid product. The solid catalyst component was analyzed by atomic adsorption spectroscopy and was found to contain 0.07% by weight of zirconium atoms, 0.48% by weight of aluminum atoms, 0.26% by weight of magnesium atoms and [Al]:[Zr]=22:1.

Example 16
Ethylene Homopolymerization

An autoclave with a volume of 2 liters was purged with nitrogen at 130° C. for 30 minutes. After cooling the autoclave to 80° C., one liter of n-hexane was introduced to the reactor, then the reactor was pressurized up to 15 bar with ethylene. Then 1.5 cc of M-MAO solution (7 wt% Al) were injected into the reactor by means of a catalyst injection pump. This was followed by injection of 0.10 g of the solid catalyst H described in Example 15 slurried in 20 cc of n-hexane solvent. The reactor temperature was raised to 85° C. Ethylene polymerization was carried out for 30 minutes, with ethylene supplied on demand to maintain the total reactor pressure at 15 bar and 114.9 grams of polyethylene were recovered.

The polyethylene was examined by GPC and was found to have an weight average molecular weight of 121,000, a number average molecular weight of 45,200 and a broad molecular weight distribution of 2.6.

Average rate of Polymerization=

$$\frac{114.9 \text{ g} \times 0.463 \text{ psi}}{0.000767 \text{ mmol} \times 0.5 \text{ hr}} = 138{,}707 \text{ g PE/mmol Zr h, at 100 psig}$$

We claim:
1. A catalyst composition for olefin polymerization which comprises
   A) a solid catalyst precursor component comprising a metallocene transition metal compound, a magnesium compound, a hydroxyl containing compound, and a polymeric support material, and
   B) a cocatalyst comprising aluminoxanes, aluminum alkyls or mixtures of aluminum alkyls and aluminoxanes.
2. The composition of claim 1 wherein the olefin polymerization comprises homopolymerization of olefins or copolymerization of olefins with alpha-olefins.
3. The composition of claim 1 wherein the solid catalyst precursor component further comprises a silicon compound.
4. The catalyst composition of claim 1 wherein the solid catalyst precursor component further comprises an aluminum compound.
5. The catalyst composition of claim 1 wherein the polymeric support material comprises polymer particles having a mean particle diameter of about 5 μm to about 1,000 μm, a pore volume of at least 0.1 cm³/g, a pore radius of at least 10 Angstroms and a surface area of from about 0.2 m²/gm to about 15 m²/gm.
6. The catalyst composition of claim 5 wherein the polymer particles are polyolefins, polyvinylchloride, polyvinylalcohol or polycarbonate.
7. The catalyst composition of claim 5 wherein the polymeric support material is polyvinylchloride particles.
8. The catalyst composition of claim 7, wherein the polyvinylchloride particles are spherical in shape.
9. The catalyst composition of claim 7, wherein the polyvinylchloride particles have a molecular weight in the range of 5,000 to 200,000 g/mole.
10. The catalyst composition of claim 1 wherein the metallocene transition metal compound is a zirconium compound.
11. The catalyst composition of claim 10 wherein the zirconium compound is represented by the general formula $(Cp)_zZrR_wX_y$ wherein Cp represents a unsubstituted or substituted cyclopentadienyl ring, X represents a halogen atom, and $1 \leq z \leq 3$, $0 \leq w \leq 3$ and $0 \leq y \leq 3$.
12. The catalyst composition of claim 11 wherein the cyclopentadienyl ring is substituted with a hydrocarbyl radical of alkyl, alkenyl or aryl, said hydrocarbyl radical containing 1 to 20 carbon atoms.
13. The catalyst composition of claim 12 wherein the hydrocarbyl radical is methyl, ethyl, propyl, amyl, isoamyl, isobutyl or phenyl.
14. The catalyst composition of claim 4 wherein the aluminum compound is an aluminoxane represented by the general formulas

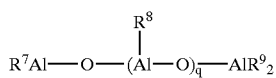

for a linear aluminoxane, where q represents a number satisfying $0 \leq q < 50$ and/or

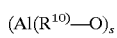

for a cyclic aluminoxane, wherein s represents a number satisfying $3 \leq s \leq 50$, wherein $R^7$, $R^8$, $R^9$ and $R^{10}$ are either the same or different linear, branched or cyclic alkyl group of 1 to 12 carbons.
15. The catalyst composition of claim 1 having a Al:Zr molar ratio of about 2:1 to about 50:1.
16. The catalyst composition of claim 1 wherein the magnesium compound is a reagent with a chemical formula $R_aMgX_{2-a}$ wherein R is an alkyl group having 1 to 20 carbon atom and X is halogen or alkyl group independently having 1 to 20 carbon atoms and a is 0, 1, or 2.
17. The catalyst composition claim 16 wherein the magnesium compound is diethylmagnesium, dibutylmagnesium, butylethylmagnesium, dihexylmagnesium, butyloctyl magnesium, ethylmagnesium chloride, butylmagnesium chloride, hexylmagnesium chloride or mixtures thereof.
18. The catalyst composition of claim 4 wherein the silicon compound is represented by the general formula $SiX_4$ wherein X is a halogen.
19. The catalyst composition of claim 18 wherein $SiX_4$ is silicon tetrachloride.
20. The catalyst composition of claim 1 wherein the hydroxyl containing compound is represented by the formula $Z^+OH^-$ wherein $Z^+$ is any metal in the Periodic Table of the Elements of Group IA to Group VIA, or an alkyl group having 1 to 20 carbon atoms, or a cationic non-metal.

21. The catalyst composition of claim 1 wherein the cocatalyst comprises a mixture of a trialkylaluminum and an alkyl aluminoxane.

22. The catalyst composition of claim 21 wherein the alkyl aluminoxane is methyl aluminoxane, ethyl aluminoxane and/or propyl aluminoxane.

23. The catalyst composition of claim 10 wherein the cocatalyst is present in an amount which provides a ratio of aluminum atoms in the cocatalyst to zirconium atoms in the catalyst precursor component from about 10:1 to about 1500:1.

24. The catalyst composition of claim 2 wherein the olefin polymerization comprises homopolymerization of olefins or copolymerization of olefins with alpha-olefins.

25. A method for polymerizing olefins comprises contacting olefins with a catalyst composition which comprises (A) a solid catalyst precursor component comprising a metallocene transition metal compound, a magnesium compound, a hydroxyl containing compound, and a polymeric support material, and (B) a cocatalyst comprising aluminoxanes, aluminum alkyls or mixtures of aluminum alkyls and aluminoxanes, said contacting under olefin polymerization conditions.

26. The method of claim 25 wherein the olefin polymerization comprises homopolymerization of olefins or copolymerization of olefins with alpha-olefins.

27. The method of claim 26 wherein the olefin polymerization comprises homopolymerization of olefins or copolymerization of olefins with alpha-olefins.

* * * * *